(12) United States Patent
Wang et al.

(10) Patent No.: US 11,507,224 B2
(45) Date of Patent: Nov. 22, 2022

(54) TOUCH DISPLAY DEVICE, TOUCH RESPONSE METHOD AND SYSTEM THEREOF, AND STORAGE MEDIUM

(71) Applicants: BEIJING BOE DISPLAY TECHNOLOGY CO., LTD., Beijing (CN); BOE TECHNOLOGY GROUP CO., LTD., Beijing (CN)

(72) Inventors: Jianting Wang, Beijing (CN); Jieqiong Wang, Beijing (CN); Wei Wang, Beijing (CN); Yang Shi, Beijing (CN); Cuilan Huang, Beijing (CN); Ying Xing, Beijing (CN)

(73) Assignees: BEIJING BOE DISPLAY TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/280,320

(22) PCT Filed: May 28, 2020

(86) PCT No.: PCT/CN2020/093023
§ 371 (c)(1),
(2) Date: Mar. 26, 2021

(87) PCT Pub. No.: WO2021/237614
PCT Pub. Date: Dec. 2, 2021

(65) Prior Publication Data
US 2022/0206655 A1 Jun. 30, 2022

(51) Int. Cl.
G06F 3/041 (2006.01)

(52) U.S. Cl.
CPC .................. *G06F 3/04166* (2019.05)

(58) Field of Classification Search
CPC ..... G06F 5/06; G06F 13/1673; G06F 3/04166
See application file for complete search history.

(56) References Cited

U.S. PATENT DOCUMENTS

| 9,335,861 B2* | 5/2016 | Shin ................. G06F 3/04166 |
| 2010/0118183 A1* | 5/2010 | Stevens .................. H04N 7/01 348/E7.003 |
| 2012/0050613 A1* | 3/2012 | Halna Du Fretay ... H04N 9/475 348/E9.034 |
| 2014/0267093 A1* | 9/2014 | Comstock ........... G06F 3/04186 345/173 |

(Continued)

FOREIGN PATENT DOCUMENTS

| CN | 102547435 A | 7/2012 |
| CN | 105118424 A | 12/2015 |

(Continued)

*Primary Examiner* — Robin J Mishler
(74) *Attorney, Agent, or Firm* — Fay Sharpe LLP

(57) ABSTRACT

A touch response method of a touch display device is provided. The touch display device includes a data buffer. The method includes: acquiring touch data generated based on a touch operation of a user on the touch display device; controlling the data buffer to buffer the touch data according to a target mode; the target mode including a single-frame first-in first-out mode or a line buffer mode; and converting a frame rate of the touch data in the data buffer based on a target frame-rate processing format.

18 Claims, 7 Drawing Sheets

(56) References Cited

U.S. PATENT DOCUMENTS

| | | | |
|---|---|---|---|
| 2015/0382066 A1* | 12/2015 | Heeter | H04N 21/4222 |
| | | | 386/234 |
| 2016/0335741 A1 | 11/2016 | Zhao | |
| 2019/0129526 A1* | 5/2019 | Cheng | G06F 3/041 |
| 2021/0109613 A1 | 4/2021 | Guo et al. | |

FOREIGN PATENT DOCUMENTS

| | | |
|---|---|---|
| CN | 107172365 A | 9/2017 |
| CN | 110716671 A | 1/2020 |

* cited by examiner

TOUCH DISPLAY DEVICE, TOUCH RESPONSE METHOD AND SYSTEM THEREOF, AND STORAGE MEDIUM

CROSS-REFERENCE TO RELATED APPLICATIONS

This application is a 371 of PCT Application No. PCT/CN2020/093023, filed on May 28, 2020, the disclosures of which are incorporated herein by reference in its entireties.

TECHNICAL FIELD

The present disclosure relates to the field of computer technologies, and in particular, relates to a touch display device, a touch response method and system thereof, and a storage medium.

BACKGROUND

As a human-computer interactive electronic exhibition platform integrating a variety of technologies, an interactive whiteboard (IWB) can exhibit content displayed on a smart terminal for users to watch or to edit through a touch operation, and thus have been widely applied to various fields.

The IWB can be connected with the smart terminal. The content displayed on the smart terminal can be synchronized to the IWB. The IWB can synchronously edit the content displayed thereon in response to the received touch operation, and the edited content can be synchronized and displayed on the smart terminal again. That is, users can control the smart terminal by performing a touch operation on the IWB.

However, touch delay becomes relatively obvious as the size of the IWB becomes larger and larger.

SUMMARY

In an aspect, a touch response method of a touch display device is provided. The touch display device includes: a data buffer. The method includes:
acquiring touch data generated based on a touch operation of a user on the touch display device;
controlling the data buffer to buffer the touch data based on a target mode, the target mode including: a single-frame first-in first-out mode or a line buffer mode; and
converting a frame rate of the touch data in the data buffer based on a target frame-rate processing format.

In another aspect, a touch response apparatus of a touch display device is provided. The touch display device has a touch area and includes: a data buffer and a processor. The processor is configured to:
acquire touch data generated based on a touch operation of a user on the touch area;
control the data buffer to buffer the touch data based on a target mode, the target mode including: a single-frame first-in first-out mode or a line buffer mode; and
convert a frame rate of the touch data in the data buffer based on a target frame-rate processing format.

In another aspect, a touch response system of a touch display device is provided. The system includes: a terminal device and the touch display device as described in the above embodiments;
wherein a communication connection is established between the terminal device and the touch display device; and the touch display device is configured to: acquire touch data generated based on a touch operation of a user on the touch display device, control the data buffer to buffer the touch data based on a target mode, send a format acquisition request to the terminal device, and convert a frame rate of the touch data in the data buffer based on a target frame-rate processing format sent by the terminal device, wherein the target mode comprises: a single-frame first-in first-out mode or a line buffer mode, and the terminal device is configured to send a target frame-rate processing format to the touch display device based on the format acquisition request.

In another aspect, a non-volatile computer-readable storage medium storing instructions is provided. The computer-readable storage medium, when running on a computer, causes the computer to execute the touch response method of the touch display device as described in the above embodiments.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The concept of the present disclosure is described in detail hereinafter with reference to the accompanying drawings and some embodiments, to more clearly present the objects, technical solutions, and advantages of the concept of the present disclosure.

Figure 1:
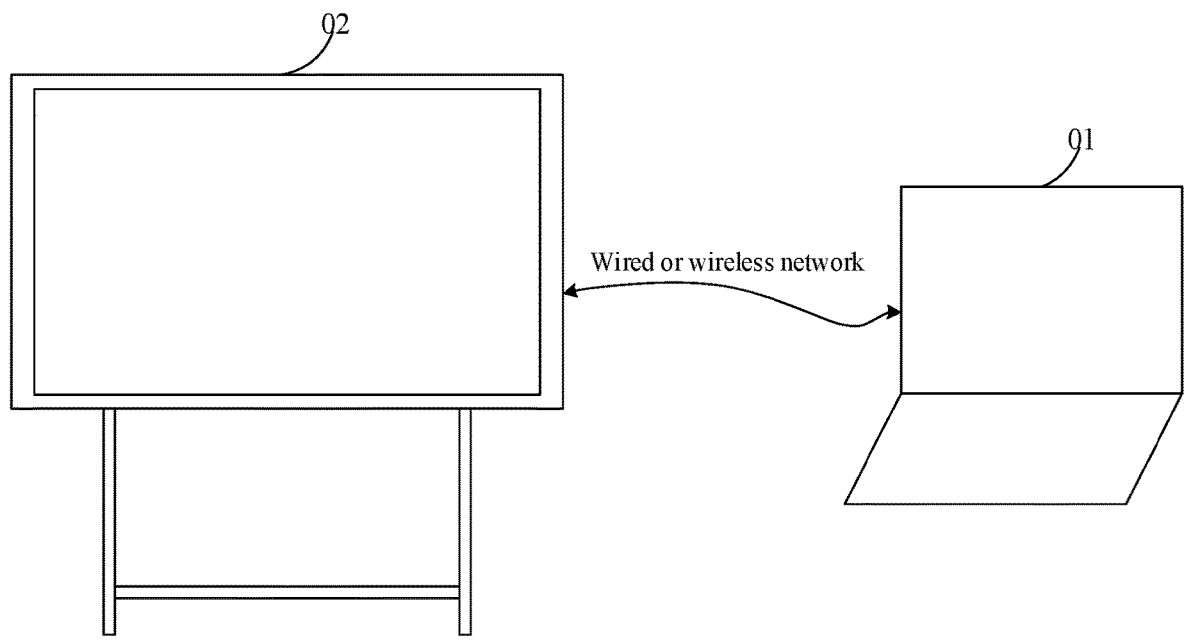
FIG. 1 is a schematic diagram of a system formed by a touch display device and a terminal device according to one or more embodiments of the present disclosure.

In one or more embodiments, as illustrated in FIG. 1, a schematic diagram of a system formed by a touch display device and a terminal device is illustrated. As illustrated in FIG. 1, the system may include: a terminal device 01 and a touch display device 02, and the touch display device 02 may have a touch area for users to touch.

With reference to FIG. 1, a communication connection may be established between the terminal device 01 and the touch display device 02 through a wired or wireless network, and the terminal device 01 and the touch display device 02 may perform data transmission based on the communication connection. For example, the touch display device 02 may acquire touch data, which is generated based on a touch operation of a user on a touch area of the touch display device 02, and send the touch data in real time to the terminal device 01 for display by the terminal device 01. That is, images displayed on the touch display device 02 and the terminal device 01 may be updated synchronously. Optionally, the touch data acquired by the touch display device 02 may be data generated directly based on the touch operation performed by the user in the touch area, or may be data that is generated after a series of processing (such as optimization) on the touch operation performed by the user in the touch area.

Figure 2:
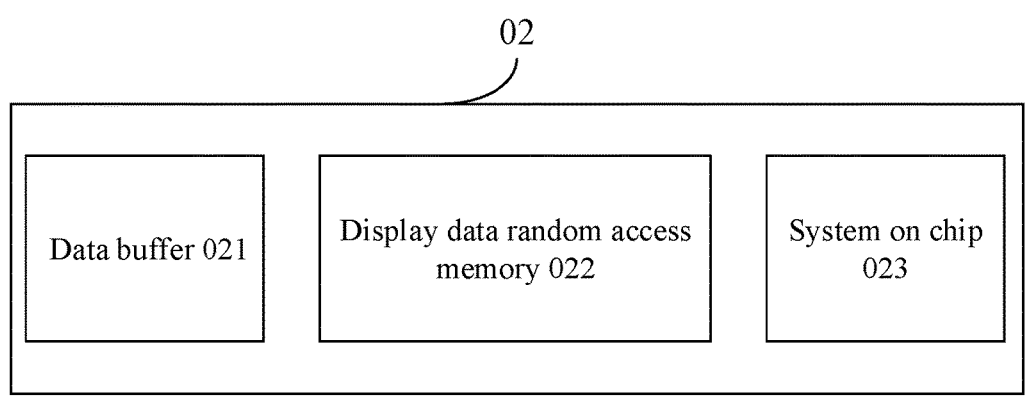
FIG. 2 is a schematic structural diagram of a touch display device according to one or more embodiments of the present disclosure.

Optionally, in one or more embodiments, with reference to FIG. 1 and FIG. 2, the touch display device 02 may at least include a data buffer 021, a display data random access memory (DDRAM) 022, and a system on chip (SOC) 023 which may be also referred to as a processing chip. The processing chip may include a touch response apparatus capable of implementing the touch display device in the embodiments of the present disclosure. Both the data buffer 021 and the DDRAM 022 may be configured to buffer uncompressed video transport stream (TS) data. That is, the DDRAM 022 is also a kind of buffer, but generally buffers a frame (i.e., frame buffer). Each frame of data buffered by the DDRAM 022 may form a frame of image.

Optionally, the touch display device 02 may be an all-in-one touch machine that integrates touch control and display and is capable of transmitting data with the terminal device 01. From the perspective of application scenarios, the all-in-one touch machine is a smart interactive device, such as a conference machine and an education machine, having functions such as writing, file playback and video. For example, the touch display device 02 illustrated in FIG. 1 is an IWB in scenarios such as education or conferences. The terminal device 01 may be a built-in or external computer device compliant with an open pluggable specification (OPS). That is, the touch display device 02 may be provided with a built-in OPS terminal device, or a connection may be established between the touch display device 02 and a computer device independent of the touch display device 02. Moreover, the touch display device 02 may be a display device capable of supporting a multi-processing system. For example, the terminal device 01 illustrated in FIG. 1 is an external notebook computer.

Factors affecting the touch response speed are analyzed as follows by taking the touch display device being an IWB as an example.

In general, the IWB may also include: a touch drive integrated circuit (IC), which performs touch drive based on a touch operation, and a display drive IC, also referred to as a display system, which displays images based on a touch operation. The factors affecting the touch response speed of the IWB may include the followings: first, the report rate at touch coordinates of the touch drive IC; second, some software algorithms (such as software related to writing trajectory processing) configured in the IWB, for example, software algorithms related to data packet transmission, conversation, expression, and graphic fitting based on a touch operation; and third, delay of processing the touch data by a display system. For example, processing the touch data by a display system may include: noise reduction, motion compensation, small-angle calculation, frame-rate conversion, scaling and a series of other processing. Moreover, the display system generally processes multiple frames of data simultaneously. For example, the display system receives multiple frames of touch data simultaneously, and performs noise reduction or motion compensation on the multiple frames of touch data.

With the iterative update of touch drive ICs and the continuous improvement of software algorithms, the multi-frame processing of the display system has become the main factor leading to an increase in the sense of touch delay. During multi-frame processing, it is generally necessary to perform buffering by the DDRAM 022. Assuming that three frames are processed at the same time, and a delay of x milliseconds (ms) is caused by processing one frame (for example, 60 Hz), then a delay of 3× ms may be caused when the three frames are processed simultaneously, thereby resulting in an obvious sense of touch delay.

Figure 3:
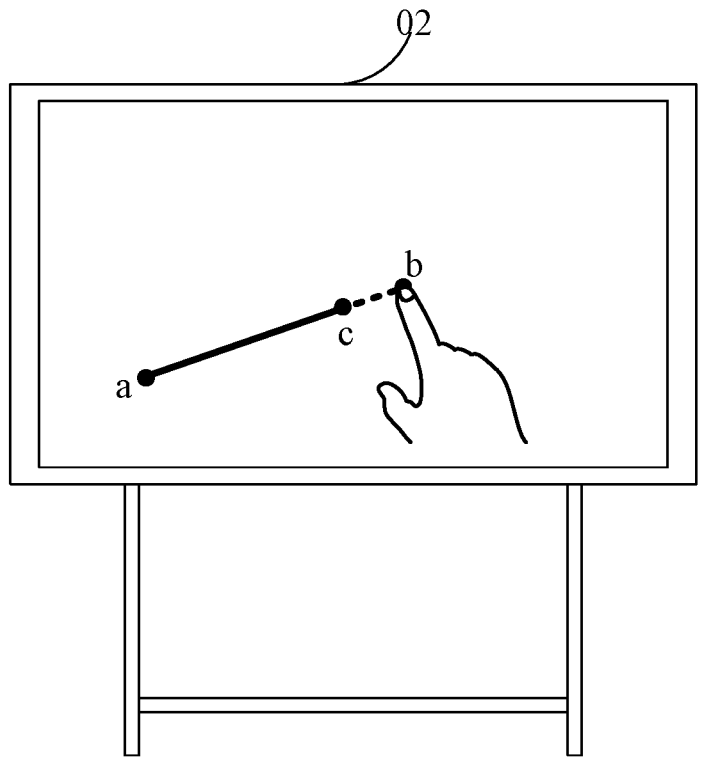
FIG. 3 is a schematic diagram of touch delay in a touch display device according to one or more embodiments of the present disclosure.

For example, with reference to FIG. 3, it is assumed that a touch operation performed by a user on the IWB is to draw a straight-line image from a point a to a point b. When the user ends the touch operation, a straight-line image from the point a to a point c is only displayed on the IWB due to the problem of touch delay, and the straight-line image from point c to point b is not displayed (the dotted line in FIG. 3 means non-display). Point c is located between point a and point b.

An embodiment of the present disclosure provides a touch response method of a touch display device. According to this method, algorithms related to the multi-frame processing is disabled, the touch data is buffered by a single-frame first-in first-out (FIFO) mode or a line buffer mode, and the frame rate of the touch data is converted based on a pixel-by-pixel full/half frame-rate format. The touch delay is effectively reduced without reducing the quality of a picture displayed by the touch display device, thereby improving user experience.

Figure 4:
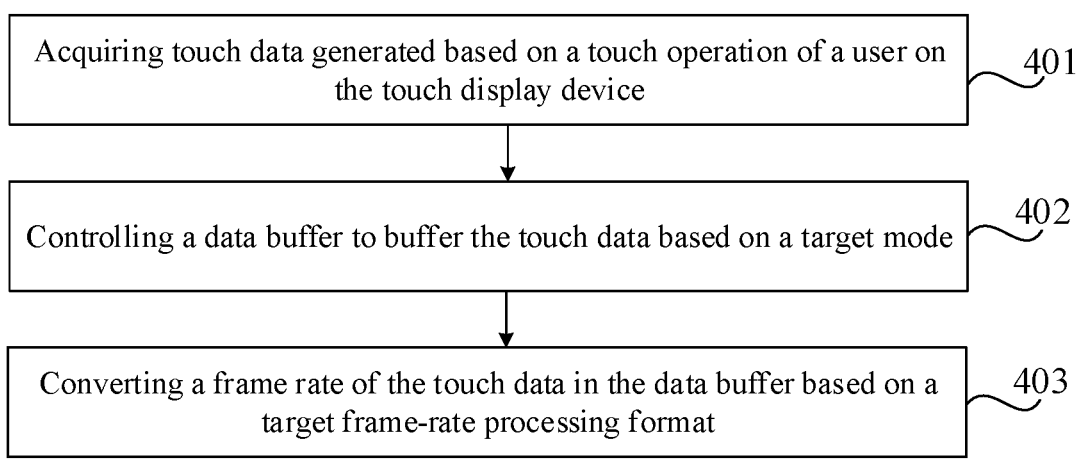
FIG. 4 is a flow chart of a touch response method of a touch display device according to one or more embodiments of the present disclosure.

FIG. 4 is a flow chart of a touch response method of a touch display device according to one or more embodiments of the present disclosure. The method is applicable to the SOC of the touch display device 02 as illustrated in FIG. 1. In other words, the method may be performed by the SOC of the touch display device 02 and implemented in the touch display device 02. As illustrated in FIG. 4, the method may include the following steps.

In step 401, touch data generated based on a touch operation of a user on the touch display device is acquired.

When a user performs a touch operation on a touch area of the touch display device, the SOC of the touch display device can detect the touch operation, and acquire the touch data generated based on the touch operation.

In step 402, the data buffer is controlled to buffer the touch data based on a target mode.

The target mode may include: a single-frame FIFO mode or a line buffer mode. In order to improve the sense of touch delay while the reliability in display is ensured, the SOC may control the data buffer to buffer the touch data based on the above target mode, to reduce algorithms related to frame buffering.

In step 403, a frame rate of the touch data in the data buffer is converted based on a target frame-rate processing format.

After the touch data is buffered, the SOC may further convert the frame rate of the touch data buffered in the data buffer based on a target frame-rate processing format, to ensure reliable display of touch display device. Optionally, the target frame-rate processing format may be acquired by the SOC from the terminal device in advance.

In summary, the embodiments of the present disclosure provide a touch response method of a touch display device. According to this method, touch data generated based on a touch operation of a user on the touch display device can be acquired; the data buffer can be controlled to buffer the touch data based on a single-frame first-in first-out mode or a line buffer mode; and the frame rate of the touch data in the data buffer can be converted based on a target frame-rate processing format. Therefore, while it's ensured that the touch display device displays reliably based on the touch data, algorithms related to frame buffering are reduced, thereby improving the touch response speed and improving the sense of touch delay.

Figure 5:
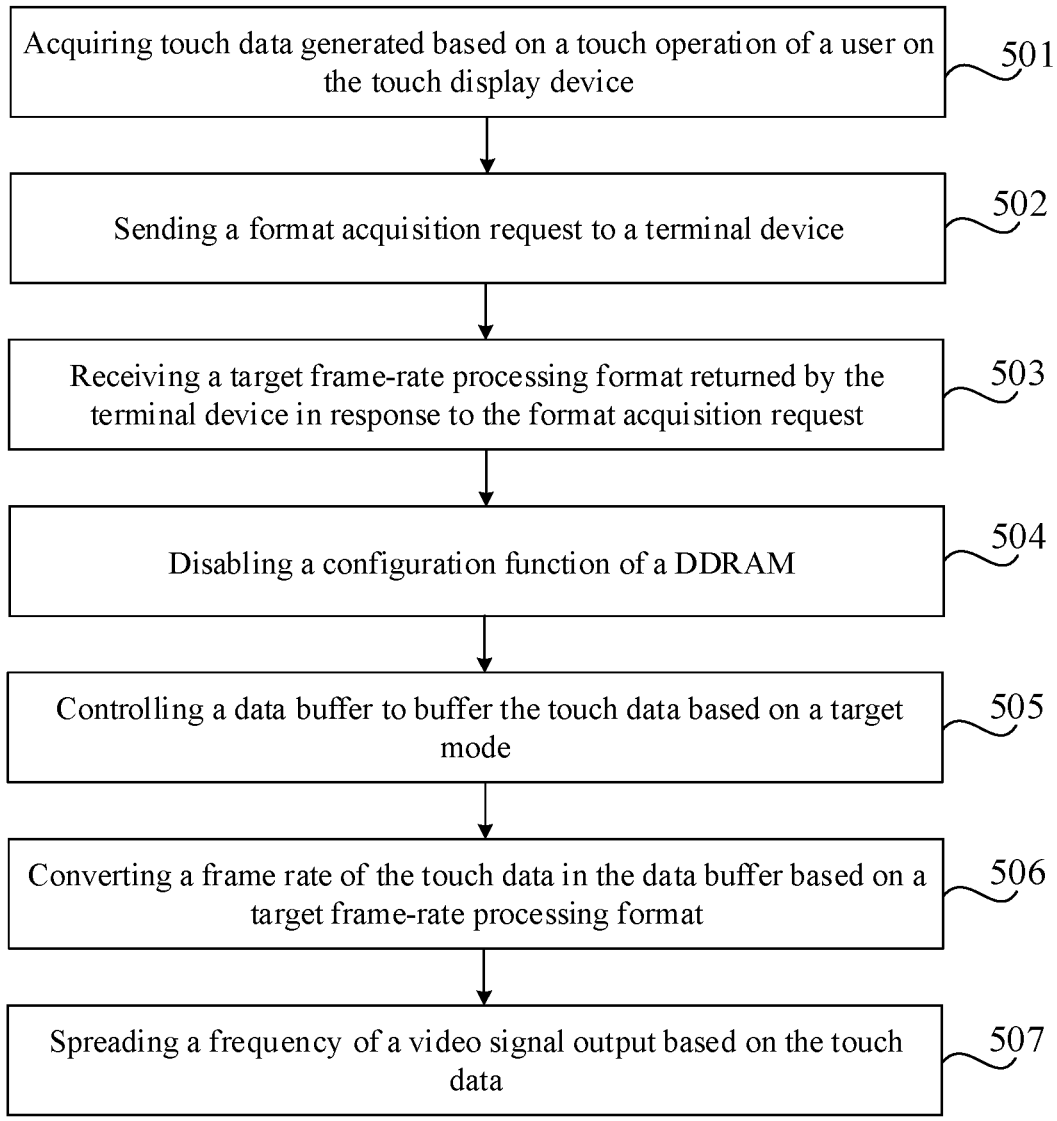
FIG. 5 is a flow chart of another touch response method of a touch display device according to one or more embodiments of the present disclosure.

The touch response method is introduced by taking the touch display device being an IWB as an example. FIG. 5 is a flow chart of another touch response method of a touch display device according to one or more embodiments of the present disclosure. The method is applicable to the SOC of the touch display device 02 as illustrated in FIG. 1. As illustrated in FIG. 5, the method may include the following steps.

In step 501, touch data generated based on a touch operation of a user on the touch display device is acquired.

Optionally, the SOC may detect, in real time or every a preset period of time, whether the user performs the touch operation on the touch area. If the touch operation is detected, the SOC may further acquire the touch data generated based on the touch operation. Moreover, the touch data acquired by the SOC may be data that is directly generated based on the touch operation of the user without any processing (such as motion compensation, noise reduction or beautification). Alternatively, the touch data acquired by the SOC may be data that is obtained after performing optimization on the touch data generated based on the touch operation of the user. The acquired touch data is not limited in the embodiments of the present disclosure.

In addition, in combination with the embodiment of FIG. 1, the touch display device may be provided with a built-in terminal device or an external terminal device. Moreover, for the built-in terminal device, the touch operation may be fed back to the SOC through an internal touch following channel. Therefore, if the touch display device is a built-in terminal device, the SOC of the touch display device may determine that a touch operation is detected, when judging that the internal touch following channel is present. Similarly, for the external terminal device, the touch operation may be fed back to the SOC through an external touch following channel. Therefore, if the touch display device is an external terminal device, the SOC of the touch display device may determine that a touch operation is detected, when judging that the external touch following channel is present. That is, "detecting the touch operation and acquiring the touch data" may be understood as an operation of "executing the reading of the touch data and determining whether the channel follows a touch".

In step 502, a format acquisition request is sent to the terminal device.

Optionally, when working normally, the touch display device may display an image based on the received touch operation, for example, a trajectory of the touch operation. Alternatively, the touch display device may display an image automatically instead of based on the touch operation. For example, the touch display device directly receives and displays an image sent by the terminal device. In the situation where the touch display device displays normally without receiving a touch operation, there is no touch delay problem since the user does not perform the touch operation on the touch display device. The problem of touch delay exists only in the situation where the touch display device displays an image based on the touch operation. Therefore, the SOC of the touch display device may further send a format acquisition request to the terminal device connected to the touch display device when a touch operation is detected. Accordingly, if no touch operation is detected, that is, no touch data is acquired, the touch display device may not execute the following steps, and may, for example, directly enter a normal display procedure.

The SOC may send a format acquisition request to the terminal device via a direct digital control (DDC) communication interface. The format acquisition request may be used to request a format for performing frame-rate processing on the touch data when display is finally based on the touch data. For example, the format acquisition request may carry a first frame-rate processing format and a second frame-rate processing format. In addition, frame rate refers to the number of frames or images that can be displayed per second. Accordingly, the frame-rate processing may refer to controlling the touch display device to simultaneously display images corresponding to touch data of several frame rates.

In order to further ensure that the required frame-rate processing format may be acquired, the format acquisition request sent by the SOC to the terminal device may further carry request priorities of the two frame-rate processing formats. The higher the request priority is, the more desired the touch display device requires to acquire the corresponding frame-rate processing format. For example, the request priority of the first frame-rate processing format may be higher than the request priority of the second frame-rate processing format.

Optionally, the first frame-rate processing format with the higher priority may be a full frame-rate processing format. The second frame-rate processing format with the lower priority may be a half frame-rate processing format. The full frame-rate processing refers to that the number of frame rates processed simultaneously is the same as the number of received frame rates. The half frame-rate processing refers to that the number of frame rates processed simultaneously is half the number of received frame rates, that is, two times of processing are required to cover all the frame rates.

In step 503, a target frame-rate processing format returned by the terminal device in response to the format acquisition request is received.

Optionally, the frame-rate processing format adopted by the touch display device for processing the touch data needs to be the same as the frame-rate processing format supported by the connected terminal device, and the content carried in the format acquisition request received by the terminal device includes the first frame-rate processing format and the second frame-rate processing format. Therefore, the target frame-rate processing format sent by the terminal device to the SOC is either the first frame-rate processing format or the second frame-rate processing format. That is, the target frame-rate processing format returned by the terminal device may be the first frame-rate processing format or second frame-rate processing format supported by the terminal device.

In addition, if the format acquisition request received by the terminal device also carries that the priority of the first frame-rate processing format is higher than the priority of the second frame-rate processing format, the terminal device, when receiving the format acquisition request, may first determine the frame-rate processing format supported by itself, and then sends the target frame-rate processing format to the SOC reliably based on the frame-rate processing format supported by itself and the priority carried in the received format acquisition request. For example, if the frame-rate processing format supported by the terminal device includes the first frame-rate processing format and the second frame-rate processing format, that is, the terminal device can support the frame-rate processing format with a prioritized requirement, then the terminal device certainly sends the first frame-rate processing format corresponding to the prioritized requirement to the touch display device as far as possible. That is, the target frame-rate processing format received by the SOC is the first frame-rate processing format. If the frame-rate processing format supported by the terminal device includes the second frame-rate processing format of the first and second frame-rate processing formats, that is the terminal device cannot support the prioritized requirement, then the terminal device may send the second frame-rate processing format corresponding to a secondary secondarily prioritized requirement to SOC. That is, the target frame-rate processing format received by the SOC is the second frame-rate processing format.

Optionally, after receiving the target frame-rate processing format, the SOC may configure the target frame-rate processing format to itself for subsequently processing the frame rate of the touch data generated based on the touch operation, thereby ensuring reliable display. In addition, the SOC may also set the frame rate to a display screen frame-rate mode, that is, the ultimate purpose of frame-rate processing is to display images.

In step 504, a configuration function of DDRAM is disabled.

In combination with the embodiment of FIG. 1, DDRAM is generally configured to buffer frames. Therefore, in order to reduce algorithms related to frame buffering, the SOC may disable the configuration function of the DDRAM.

Optionally, the DDRAM may include pins with a variety of different functions, such as a plurality of memory address select pins A0-An, a data write pin Data, and a read/write select pin R/W. Accordingly, disabling the configuration function of the DDRAM may be implemented in at least one of the following manners.

First, a DDR clock signal (i.e., DDR CLK) is prohibited from being input to the DDRAM.

Second, a plurality of memory address select pins (i.e., A0-An) are set to be in a high-impedance state.

Third, the data write pin (i.e., Data) is set to be in a high-impedance state.

Fourth, the read/write select pin (i.e., R/W) is set to be in a high-impedance state.

The high-impedance state is an output state, and setting the pin to be in the high-impedance state may be understood as setting the pin to float. Accordingly, by setting a pin to be in the high-impedance state, a signal output by the pin may be shut off. That is, the pin that is set to be in the high-impedance state does not output a signal to other devices to affect these other devices. Certainly, implementation of disabling the configuration function of the DDRAM is not limited to the manners described above.

If the SOC, after disabling the configuration function of the DDRAM, detects that the touch display device displays an image which is not generated by a touch operation (i.e., entering a normal display state) at a certain time, that is, when the SOC detects that the touch following channel is switched to other channels, the SOC may enable the configuration function of the DDRAM again to ensure the normal operation of the IWB.

In step 505, the data buffer is controlled to buffer the touch data based on a target mode.

The target mode may a single-frame FIFO mode or a line buffer mode. The single-frame FIFO mode refers to that only one frame of touch data is processed at a time, and when the touch data is written and read through the data buffer, the touch data that first enters the data buffer is first read from the data buffer. That is, the data buffer does not need to be connected to an external read/write address line. The line buffer mode refers to that when the touch data is written and read through the data buffer, the touch data is read once when a line feed operation is detected.

In the embodiments of the present disclosure, the SOC, after disabling the configuration function of the DDRAM, may adjust an operating mode of the data buffer to a target mode. That is, the data buffer is controlled to buffer the acquired touch data based on the target mode. That is, disabling the configuration function of the DDRAM described in step 504 is a prerequisite for controlling the operating mode of the data buffer to be the target mode described above.

By disabling the configuration function of the DDRAM and adjusting the data buffer to buffer the touch data in the single-frame FIFO mode or the line buffer mode, the purpose of reducing frame buffering algorithms is achieved, thereby increasing the touch response speed and alleviating the touch delay. Optionally, both the single-frame FIFO mode and the line buffer mode may be a point-to-point (i.e., pixel by pixel) mode to ensure one-to-one correspondence between display data and the touch data. The SOC, when configuring the frame rate, may simultaneously set the pixel-by-pixel processing mode. Configuring the frame rate and setting the pixel-by-pixel processing mode may also be referred to as setting a channel source output operation.

In step 506, a frame rate of the touch data in the data buffer is converted based on a target frame-rate processing format.

After the touch data is buffered, the SOC may convert, based on the pre-acquired target frame-rate processing format, the frame rate of the touch data buffered in the data buffer. Optionally, the SOC may first judge whether the target frame-rate processing format is a processing format with a prioritized requirement, and converts the frame rate of the touch data based on the judging result.

For example, it is assumed that a frame-rate processing format with a high request priority is the first frame-rate processing format which is the full frame-rate processing format, and the frame-rate processing format with a low request priority is the second frame-rate processing format which is the half frame-rate processing format. Then, when acquiring a target frame-rate processing format, the SOC may first judge whether the target frame-rate processing format is the full frame-rate processing format. If so, the SOC, in response to the target frame-rate processing format being the first frame-rate processing format, may lock a frame line of the touch data in the data buffer by locking a line clock signal and a frame clock signal which control the touch data in the data buffer. On the contrary, if the target frame-rate processing format is not the full frame-rate processing format, that is, the target frame-rate processing format is a half frame-rate processing format, the SOC, in response to the target frame-rate processing format being the second frame-rate processing format, may perform frequency-multiplied reading on the touch data in the data buffer by multiplying frequencies of the line clock signal and the frame clock signal which control the touch data in the data buffer. Afterwards, the touch display device may synchronously display an image corresponding to the touch data.

Converting the frame rate based on the target frame-rate processing format and setting the data buffer to buffer data in the target mode may be referred to as image-processing channel configuration. Step 502 to Step 506 described above may be referred to as adjusting extended display identification data (EDID).

In step 507, a frequency of a video signal output based on the touch data is spread.

In order to reduce the electromagnetic interference (EMC) from external environment to a video signal output based on the touch data, the SOC, when outputting a video signal based on the touch data for display on the touch display device, may first spread a frequency of the video signal. Spreading the frequency refers to modulating a spike signal of the video signal to change it from a narrowband signal to a frequency with sidebands, and to disperse the spike energy of the signal to a plurality of frequency bands in a frequency spreading area.

Optionally, the video signal may be output via a V-B-O interface or an LVDS interface.

It should be noted that all of the steps described above may be implemented by software algorithms. In the embodiment of the present disclosure, the method described above is illustrated with software codes by taking an example in which a bypass protection mode is used; the first frame-rate processing format with a high request priority is the full frame-rate processing format, and the second frame-rate processing format with a low request priority is the half frame-rate processing format; the target mode is a single-frame FIFO mode; noise reduction, motion compensation and direction correlational deinterlacing (DCDI) are performed; frequency spreading is performed on a clock signal in the video signal by an amplitude of 1.5%:

The scaler functional algorithm refers to an algorithm that adjusts the size of a displayed image with respect to the touch display device with different resolutions. Setting the scaler functional algorithm to 0 is not to run this algorithm.

It should be noted that the order of the steps of the touch response method of the touch display device according to the above embodiments may be adjusted properly, or added or deleted accordingly depending on circumstances. For example, 507 may be deleted based on the circumstance. Any variations to the method readily conceivable to persons skilled in the art in the technical scope disclosed by the present disclosure shall fall within the protection scope of the present disclosure, and are not repeated herein.

In summary, the embodiments of the present disclosure provide a touch response method of a touch display device. According to this method, touch data generated based on a touch operation of a user on the touch display device may be acquired; the data buffer may be controlled to buffer the touch data based on a single-frame first-in first-out mode or a line buffer mode; and a frame rate of the touch data in the data buffer may be converted based on a target frame-rate processing format. Therefore, while reliable display of the touch display device based on the touch data is guaranteed, the touch response speed is improved by means of reducing algorithms related to frame buffering, thereby improving the sense of touch delay.

Figure 6:
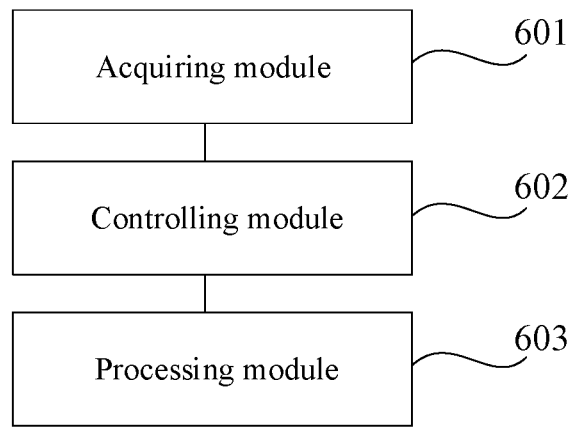
FIG. 6 is a block diagram of a touch response apparatus of a touch display device according to one or more embodiments of the present disclosure.

FIG. 6 is a block diagram of a touch response apparatus of a touch display device according to one or more embodiments of the present disclosure. The apparatus may be provided in the SOC of the touch display device in the implementation environment illustrated in FIG. 1, or may be provided in the SOC. As illustrated in FIG. 6, the apparatus may include:

an acquiring module 601 configured to acquire touch data generated based on a touch operation of a user on a touch area;

a controlling module 602 configured to control a data buffer to buffer the touch data based on a target mode, wherein the target mode may include: a single-frame first-in first-out mode or a line buffer mode; and a processing module 603 configured to convert a frame rate of the touch data in the data buffer based on a target frame-rate processing format.

Figure 7:
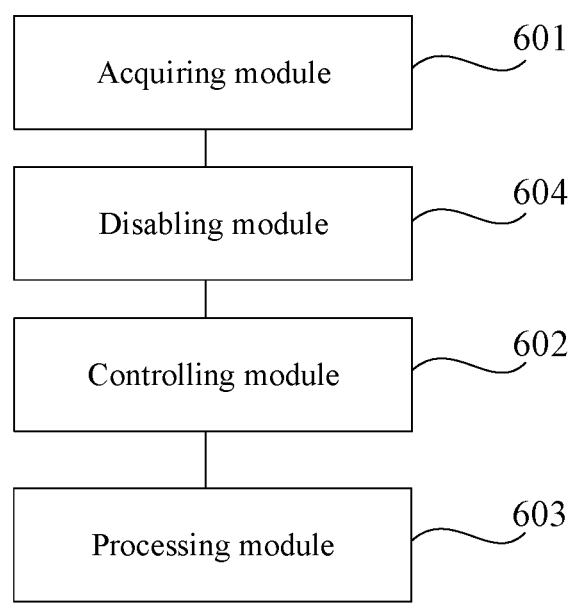
FIG. 7 is a block diagram of another touch response apparatus of a touch display device according to one or more embodiments of the present disclosure.

Optionally, as illustrated in FIG. 2, the touch display device may further include: a display data random access memory (DDRAM) 022. FIG. 7 is a block diagram of a touch response apparatus of a touch display device accord-

```
{buffer ==single-frame FIFO mode;            //setting the data buffer to work based on the
single-frame FIFO mode
QDram EN;                                    //controlling the DDRAM to enter an enabled status
Bypass noise reduction;                         //setting noise reduction
Bypass motion compensation;                     //setting motion compensation
Bypass DCDI;                                 //setting DCDI
Scaler==0;                                   //setting a scaler functional algorithm to 0
If {Display frame==Input frame                  //the target frame-rate processing format being a full
frame-rate processing format
DHclock==locked;                             //locking a line clock signal
DVclock== locked;                            //locking a frame clock signal
Else
DHclock==dobule;                             //multiplying a frequency of the line clock signal
DVclock== dobule;                             //multiplying a frequency of the frame clock signal
}
{Dclock==Hintotal*Vintotal*Vfre;              //setting the clock signal to a product of a line and a frame
and a reference signal
Dclock spread frequency==1.5%;                //spreading a frequency of the clock signal by an
amplitude of 1.5%
}
``` ing to one or more embodiments of the present disclosure. As illustrated in FIG. 7, the apparatus may further include:

a disabling module 604 configured to disable the configuration function of the DDRAM before the data buffer is controlled to buffer the touch data based on the target mode.

Optionally, the DDRAM may include a plurality of memory address select pins, a data write pin, and a read/write select pin. Accordingly, the disabling module 604 may be configured to execute at least one of the following methods:

prohibiting a DDR clock signal from being input to the DDRAM;

setting the plurality of memory address select pins to be in a high-impedance state;

setting the data write pin to be in a high-impedance state; and setting the read/write select pin to be in a high-impedance state.

Figure 8:
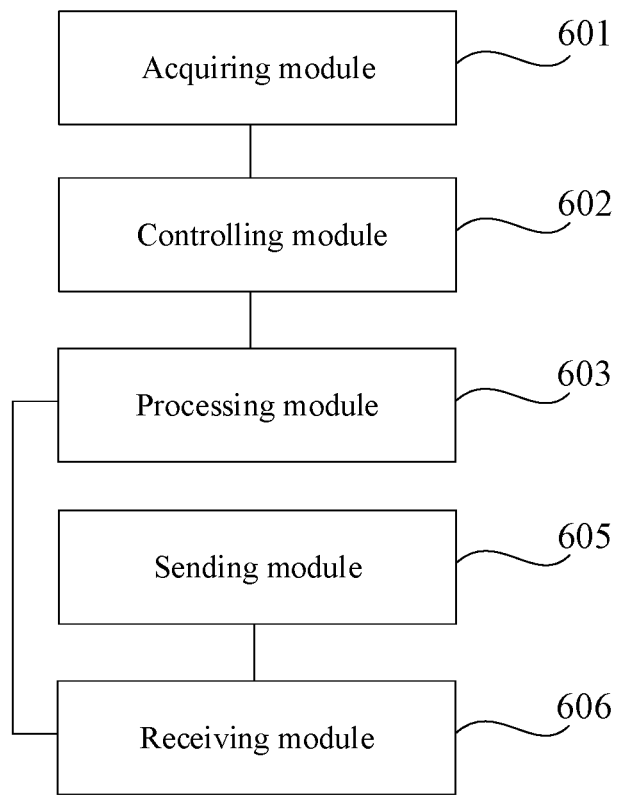
FIG. 8 is a block diagram of still another touch response apparatus of a touch display device according to one or more embodiments of the present disclosure.

Optionally, as illustrated in FIG. 1, the touch display device may be connected to the terminal device. Correspondingly, FIG. 8 is a block diagram of another touch response apparatus of a touch display device according to one or more embodiments of the present disclosure. As shown in FIG. 8, the apparatus may include:

a sending module 605 configured to send a format acquisition request to the terminal device before the frame rate of the touch data in the data buffer is converted based on the target frame-rate processing format, wherein the format acquisition request carries a first frame-rate processing format and a second frame-rate processing format; and a receiving module 606 configured to receive the target frame-rate processing format returned by the terminal device in response to the format acquisition request, wherein the target frame-rate processing format may be the first frame-rate processing format or the second frame-rate processing format supported by the terminal device.

Optionally, the format acquisition request may further carry a request priority of the first frame-rate processing format and a request priority of second frame-rate processing format, and the request priority of the first frame-rate processing format may be higher than the request priority of the second frame-rate processing format. The received target frame-rate processing format is the second frame-rate processing format if the frame-rate processing format supported by the terminal device includes the second frame-rate processing format of the first and second frame-rate processing formats. The received target frame-rate processing format is the first frame-rate processing format if the frame-rate processing format supported by the terminal device includes the first frame-rate processing format and the second frame-rate processing format.

Optionally, the first frame-rate processing format may be a full frame-rate processing format. The second frame-rate processing format may be a half frame-rate processing format.

Figure 9:
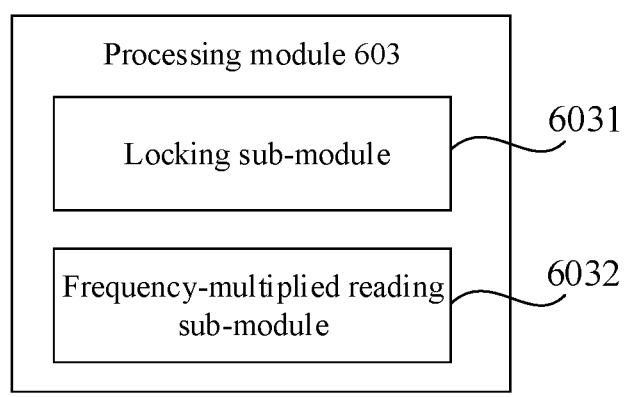
FIG. 9 is a block diagram of a processing module according to one or more embodiments of the present disclosure.

Optionally, as shown in FIG. 9, the processing module 603 may include:

a locking sub-module 6031, configured to lock a frame line of the touch data in the data buffer, in response to the target frame-rate processing format being the first frame-rate processing format; and a frequency-multiplied reading sub-module 6032, configured to perform frequency-multiplied reading on the touch data in the data buffer, in response to the target frame-rate processing format being the second frame-rate processing format.

Optionally, the locking sub-module 6031 may be configured to: lock a line clock signal controlling the touch data in the data buffer, and lock a frame clock signal controlling the touch data in the data buffer.

Optionally, the frequency-multiplied reading sub-module 6032 may be configured to multiply a frequency of the line clock signal controlling the touch data in the data buffer, and multiply a frequency of the frame clock signal controlling the touch data in the data buffer.

Figure 10:
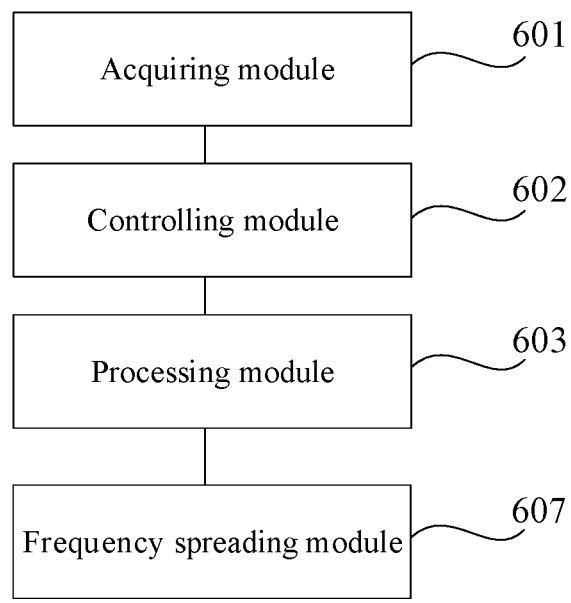
FIG. 10 is a block diagram of still another touch response apparatus of a touch display device according to one or more embodiments of the present disclosure.

Optionally, FIG. 10 illustrates a block diagram of still another touch response apparatus of a touch display device according to one or more embodiments of the present disclosure. As illustrated in FIG. 10, the apparatus may further include:

a frequency spreading module 607 configured to spread a frequency of a video signal output based on the touch data, after the frame rate of the touch data in the data buffer is converted based on the target frame-rate processing format.

In summary, the embodiments of the present disclosure provide a touch response an apparatus of a touch display device. With this apparatus, touch data generated based on a touch operation of a user on the touch display device may be acquired, the data buffer may be controlled to buffer the touch data according to a single-frame first-in first-out mode or a line buffer mode, and a frame rate of the touch data in the data buffer may be converted based on a target frame-rate processing format. Therefore, while reliable display of the touch display device based on the touch data is guaranteed, the touch response speed is improved by means of reducing algorithms related to frame buffering, thereby improving the sense of touch delay.

Optionally, with reference to FIG. 2, an embodiment of the present disclosure further provides a touch display device, which may have a touch area, and may include a data buffer 021 and a processor (i.e., the system on chip 023 illustrated in FIG. 2). The processor may be configured to execute the touch response method of the touch display device as illustrated in FIG. 6 or FIG. 7.

Figure 11:
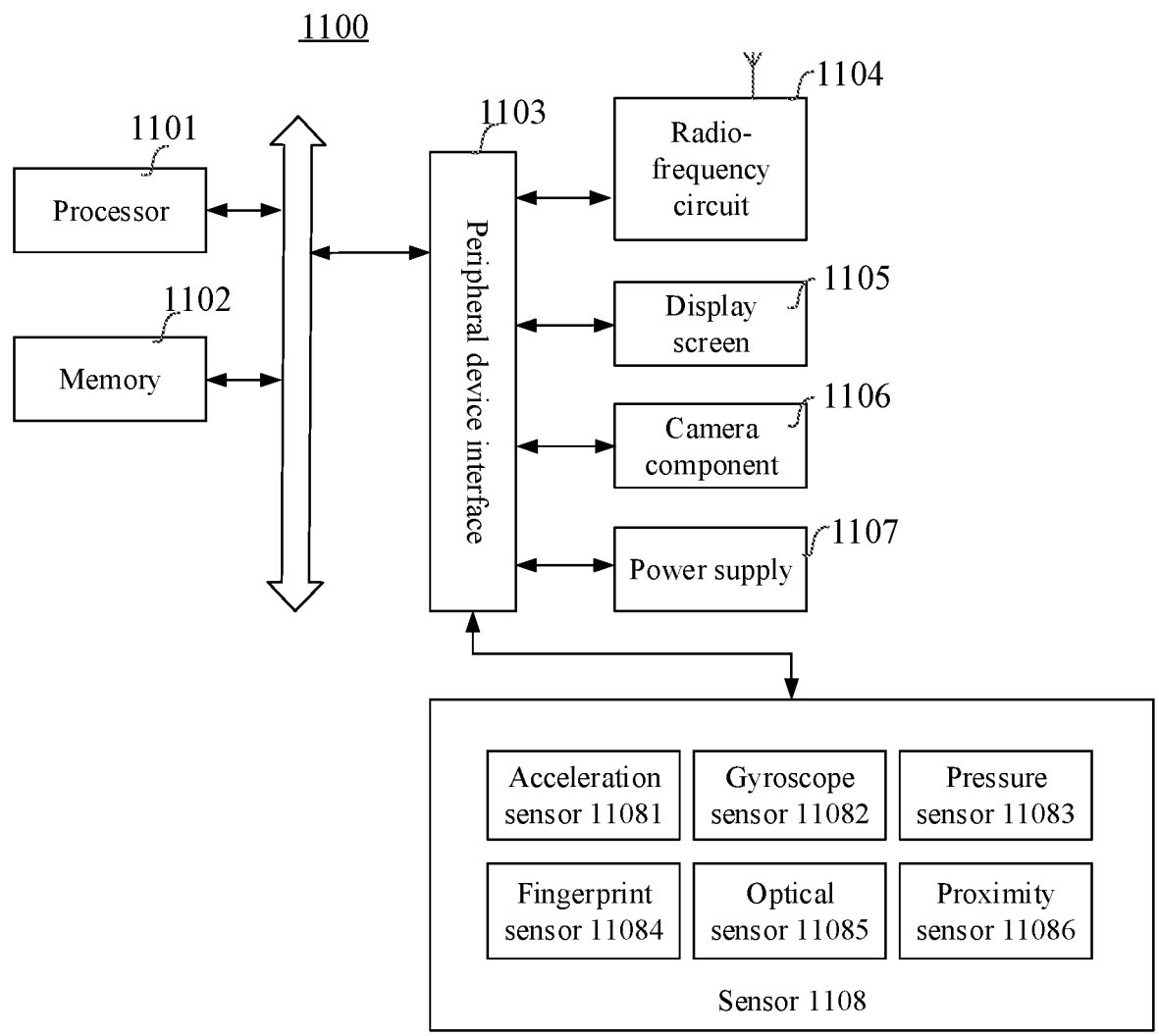
FIG. 11 is a schematic structural diagram of a hardware of a touch response apparatus of a touch display device according to one or more embodiments of the present disclosure.

FIG. 11 illustrates a structural block diagram of a touch display device 1100 according to an exemplary embodiment of the present disclosure. The device 1100 includes a processor 1101 and a memory 1102.

The processor 1101 may include one or more processing cores, such as a 4-core processor, an 11-core processor and the like. The processor 1101 may be implemented in least one of hardware forms of a digital signal processor (DSP), a field-programmable gate array (FPGA), and a programmable logic array (PLA). The processor 1101 may further include a main processor and a coprocessor. The main processor is a processor configured to process data in an awake state, which is also referred to as a central processing unit (CPU), and the coprocessor is a low power-consumption processor configured to process data in a standby state. In some embodiments, the processor 1101 may be integrated with a graphic processing unit (GPU) configured to render and draw contents to be displayed on a display screen. In some embodiments, the processor 1101 may further include an artificial intelligence (AI) processor configured to process computing operations related to machine learning.

The memory 1102 may include one or more computer-readable storage media, which may be non-transitory. The memory 1102 may further include a high speed random access memory, and a non-volatile memory, such as one or more magnetic-disk storage devices and flash storage devices. In some embodiments, the non-transitory computer-readable storage medium in the memory 1102 is configured to store at least one instruction, and the at least one instruction is configured to be executed by the processor 1101 for implementing the touch response method of the touch display device according to the embodiments of the present disclosure.

In some embodiments, the device 1100 may further include: a peripheral device interface 1103 and at least one peripheral device. The processor 1101, the memory 1102, and the peripheral device interface 1103 may be connected with one another via buses or signal lines. Each peripheral device may be connected to the peripheral device interface 1103 via a bus, a signal line or a circuit board. Specifically, the peripheral device includes at least one of a radio-frequency circuit 1104, a touch display screen 1105, a camera component 1106, an audio circuit, a positioning component, and a power supply 1107.

The peripheral device interface 1103 may be configured to connect at least one peripheral device related to input/output (I/O) to the processor 1101 and the memory 1102. In some embodiments, the processor 1101, the memory 1102 and the peripheral device interface 1103 are integrated on the same chip or circuit board. In some other embodiments, any one or two of the processor 1101, the memory 1102 and the peripheral device interface 1103 may be implemented on a separate chip or circuit board, which is not limited in this embodiment.

The radio-frequency circuit 1104 is configured to receive and transmit radio frequency (RF) signals, which are also referred to as electromagnetic signals. The radio-frequency circuit 1104 communicates with a communication network and other communication devices via the electromagnetic signals. The radio-frequency circuit 1104 converts electrical signals into electromagnetic signals for transmission, or converts received electromagnetic signals into electrical signals. Optionally, the radio-frequency circuit 1104 includes: an antenna system, an RF transceiver, one or more amplifiers, a tuner, an oscillator, a digital signal processor, a codec chipset, a user identity module card, etc. The radio-frequency circuit 1104 may communicate with other terminals over at least one wireless communication protocol. The wireless communication protocol includes but is not limited to: a metropolitan area network, various generations of mobile communication networks (2G, 3G, 4G, and 5G), a wireless local area network and/or a wireless fidelity (WiFi)) network. In some embodiments, the radio-frequency circuit 1104 may further include a circuit related to near-field communication (NFC), which is not limited in the present disclosure.

The display screen 1105 is configured to display a user interface (UI). The UI may include graphics, texts, icons, videos, and any combination thereof. When the display screen 1105 is a touch display screen, the display screen 1105 is further capable of collecting touch signals on or above the surface of the display screen 1105. The touch signals may be input to the processor 1101 as control signals for processing. Under this circumstance, the display screen 1105 may be further configured to provide virtual buttons and/or a virtual keyboard, which are also referred to as soft buttons and/or a soft keyboard. In some embodiments, there may be one display screen 1105, which is provided on a front panel of the device 1100. In some other embodiments, there may be at least two display screens 1105, which are respectively provided on different surfaces of the device 1100 or designed in a folded fashion. In still other embodiments, the display screen 1105 may be a flexible display screen, which is provided on a curved surface or fold plane of the device 1100. The display screen 1105 may be even further provided as a non-rectangular irregular pattern, i.e., a special-shaped screen. The display screen 1105 may be made from materials such as a liquid crystal display (LCD) and an organic light-emitting diode (OLED).

The camera component 1106 is configured to capture images or videos. Optionally, the camera component 1106 includes a front camera and a rear camera. Generally, the front camera is provided on a front panel of a terminal, and the rear camera is provided on the back of the terminal. In some embodiments, there are at least two rear cameras, each of which is at least one of a main camera, a depth-of-field camera, a wide-angle camera, and a telephoto camera, so as to achieve a bokeh effect by fusing the main camera and the depth-of-field camera, to achieve panoramic shooting and virtual reality (VR) shooting effects, or other fusion-based shooting effect by fusing the main camera and the wide-angle camera. In some embodiments, the camera component 1106 may further include a flashlight. The flashlight may be a monochromatic-temperature flashlight or a dichromatic-temperature flashlight. The dichromatic-temperature flashlight refers to a combination of a warm-light flashlight and a cold-light flashlight, and may serve to compensate light at different chromatic-temperatures.

The power supply 1107 is configured to supply power to respective components in the device 1100. The power supply 1107 may be alternating-current power, direct-current power, a disposable battery, or a rechargeable battery. When the power supply 1107 includes a rechargeable battery, the rechargeable battery may support wired charging or wireless charging. The rechargeable battery may be further configured to support the quick charge technology.

In some embodiments, the device 1100 further includes one or more sensors 1108. The one or more sensors 1108 include, but are not limited to, an acceleration sensor 11081, a gyroscope sensor 11082, a pressure sensor 11083, a fingerprint sensor 11084, an optical sensor 11085, and a proximity sensor 11086.

The acceleration sensor 11081 may detect the magnitudes of acceleration on three coordinate axes of a coordinate system that is established based on the device 1100. For instance, the acceleration sensor 11081 may be configured to detect components of gravitational acceleration on three coordinate axes. The processor 1101 may control a touch screen 1105 to display a user interface in a horizontal view or a vertical view based on a gravity acceleration signal collected by the acceleration sensor 11081. The acceleration sensor 11081 may be further configured to collect motion data of a game or of a user.

The device 1100 is not limited by the structure illustrated in FIG. 11, and may include more or fewer components than those as illustrated, or a combination of certain components, or have components arranged in a different fashion. In an exemplary embodiment, a non-volatile computer-readable storage medium storing instructions, such as a memory including instructions, is further provided. The computer-readable storage medium, when running on a computer, causes the computer to execute the touch response method of a touch display device as illustrated in FIG. 6 or FIG. 7.

For example, the non-transitory computer-readable storage medium may be a read-only memory (ROM), a random access memory (RAM), a CD-ROM, a magnetic tape, a floppy disk, an optical data storage device, or the like.

It should be understood that the term "a plurality of" herein refers to two or more. The term "and/or" describes an association relation between associated objects and indicates three types of possible relations. For example, A and/or B may be expressed as the following three cases: A exists alone, A and B exist concurrently, and B exists alone.

Described above are merely optional embodiments of the present disclosure, but are not intended to limit the present disclosure. Any modifications, equivalent substitutions and improvements made within the spirit and principle of the present disclosure shall fall within the protection scope of the present disclosure.

What is claimed is:

1. A touch response method of a touch display device, wherein the touch display device comprises a data buffer, and the method comprises:
   acquiring touch data generated based on a touch operation of a user on the touch display device;
   controlling the data buffer to buffer the touch data according to a target mode, the target mode comprising: a single-frame first-in first-out mode or a line buffer mode; and
   converting a frame rate of the touch data in the data buffer based on a target frame-rate processing format; and
   wherein the touch display device further comprises a display data random access memory (DDRAM); and before controlling the data buffer to buffer the touch data according to the target mode, the method further comprises: disabling a configuration function of the DDRAM.

2. The method according to claim 1, wherein the DDRAM comprises a plurality of memory address select pins, a data write pin, and a read/write select pin; and
   disabling the configuration function of the DDRAM comprises at least one of the followings:
   prohibiting a DDR clock signal from being input to the DDRAM;
   setting the plurality of memory address select pins to be in a high-impedance state;
   setting the data write pin to be in a high-impedance state; and
   setting the read/write select pin to be in a high-impedance state.

3. The method according to claim 1, wherein the touch display device is connected to a terminal device, and before converting the frame rate of the touch data in the data buffer based on the target frame-rate processing format, the method further comprises:
   sending a format acquisition request to the terminal device, the format acquisition request carrying a first frame-rate processing format and a second frame-rate processing format; and
   receiving the target frame-rate processing format returned by the terminal device in response to the format acquisition request, the target frame-rate processing format being the first frame-rate processing format or the second frame-rate supported by the terminal device.

4. The method according to claim 3, wherein the format acquisition request further carries a request priority of the first frame-rate processing format and a request priority of the second frame-rate processing format, and the request priority of the first frame-rate processing format is higher than the request priority of the second frame-rate processing format;
   the received target frame-rate processing format is the second frame-rate processing format if the frame-rate processing format supported by the terminal device comprises the second frame-rate processing format of the first frame-rate processing format and the second frame-rate processing format; or
   the received target frame-rate processing format is the first frame-rate processing format if the frame-rate processing format supported by the terminal device comprises the first frame-rate processing format and the second frame-rate processing format.

5. The method according to claim 3, wherein the first frame-rate processing format is a full frame-rate processing format; and the second frame-rate processing format is a half frame-rate processing format.

6. The method according to claim 5, wherein converting the frame rate of the touch data in the data buffer based on the target frame-rate processing format comprises:
   locking a frame line of the touch data in the data buffer, in response to the target frame-rate processing format being the first frame-rate processing format; or
   performing frequency-multiplied reading on the touch data in the data buffer, in response to the target frame-rate processing format being the second frame-rate processing format.

7. The method according to claim 6, wherein locking the frame line for the touch data in the data buffer comprises:
   locking a line clock signal controlling the touch data in the data buffer, and locking a frame clock signal controlling the touch data in the data buffer.

8. The method according to claim 6, wherein performing the frequency-multiplied reading on the touch data in the data buffer comprises:
   multiplying a frequency of a line clock signal controlling the touch data in the data buffer, and multiplying a frequency of a frame clock signal controlling the touch data in the data buffer.

9. The method according to claim 1, wherein after converting the frame rate of the touch data in the data buffer based on the target frame-rate processing format, the method further comprises: spreading a frequency of a video signal output based on the touch data.

10. The method according to claim 8, wherein the format acquisition request further carries a request priority of the first frame-rate processing format and a request priority of the second frame-rate processing format, and the request priority of the first frame-rate processing format is higher than the request priority of the second frame-rate processing format;
    the received target frame-rate processing format is the second frame-rate processing format if the frame-rate processing format supported by the terminal device comprises the second frame-rate processing format of the first frame-rate processing format and the second frame-rate processing format; or
    the received target frame-rate processing format is the first frame-rate processing format if the frame-rate processing format supported by the terminal device comprises the first frame-rate processing format and the second frame-rate processing format;
    locking the frame line of the touch data in the data buffer comprises:
    locking a line clock signal controlling the touch data in the data buffer, and locking a frame clock signal controlling the touch data in the data buffer;
    after converting the frame rate of the touch data in the data buffer based on the target frame-rate processing format, the method further comprises: spreading a frequency of a video signal output based on the touch data.

11. A touch display device, having a touch area and comprising: a data buffer and a processor, wherein the processor is configured to:
    acquire touch data generated based on a touch operation of a user on the touch area;

control the data buffer to buffer the touch data based on a target mode, the target mode comprising: a single-frame first-in first-out mode or a line buffer mode; and
convert a frame rate of the touch data in the data buffer based on a target frame-rate processing format; and
the touch display device further comprises: a display data random access memory (DDRAM), wherein the processor is further configured to: disable a configuration function of the DDRAM before controlling the data buffer to buffer the touch data based on the target mode.

12. The touch display device according to claim 11, wherein the touch display device is connected to a terminal device; and the processor is further configured to:
send a format acquisition request to the terminal device before converting the frame rate of the touch data in the data buffer based on the target frame-rate processing format, the format acquisition request carrying a first frame-rate processing format and a second frame-rate processing format; and
receive the target frame-rate processing format, which is returned by the terminal device in response to the format acquisition request, the target frame-rate processing format being the first frame-rate processing format or the second frame-rate supported by the terminal device.

13. The touch display device according to claim 12, wherein the format acquisition request further carries a request priority of the first frame-rate processing format and a request priority of the second frame-rate processing format, and the request priority of the first frame-rate processing format is higher than the request priority of the second frame-rate processing format;
the received target frame-rate processing format is the second frame-rate processing format if the frame-rate processing format supported by the terminal device comprises the second frame-rate processing format of the first frame-rate processing format and the second frame-rate processing format; or
the received target frame-rate processing format is the first frame-rate processing format if the frame-rate processing format supported by the terminal device comprises the first frame-rate processing format and the second frame-rate processing format.

14. The touch display device according to claim 12, wherein the first frame-rate processing format is a full frame-rate processing format; and the second frame-rate processing format is a half frame-rate processing format.

15. The touch display device according to claim 14, wherein the processor is configured to:
lock a frame line of the touch data in the data buffer, in response to the target frame-rate processing format being the first frame-rate processing format; or
perform frequency-multiplied reading on the touch data in the data buffer, in response to the target frame-rate processing format being the second frame-rate processing format.

16. A touch response system of a touch display device, comprising: a terminal device and the touch display device according to claim 12;
wherein a communication connection is established between the terminal device and the touch display device; and
the touch display device is configured to: acquire touch data generated based on a touch operation of a user on the touch display device, control the data buffer to buffer the touch data based on a target mode, send a format acquisition request to the terminal device, and convert a frame rate of the touch data in the data buffer based on a target frame-rate processing format sent by the terminal device, wherein the target mode comprises: a single-frame first-in first-out mode or a line buffer mode; and the terminal device is configured to send the target frame-rate processing format to the touch display device based on the format acquisition request.

17. The system according to claim 16, wherein the terminal device is a built-in open pluggable computer device or an external computer device.

18. A non-transitory computer-readable storage medium storing instructions therein, wherein the computer-readable storage medium, when running on a computer, causes the computer to execute the touch response method of the touch display device according to claim 1.

* * * * *